July 21, 1931. P. MATHEWS, JR 1,815,791

AUTOMATIC CONTROL EQUIPMENT

Filed Sept. 17, 1929

Inventor:
Paul Mathews Jr,
by Charles E. Mullan
His Attorney.

Patented July 21, 1931

1,815,791

UNITED STATES PATENT OFFICE

PAUL MATHEWS, JR., OF BEDFORD, ENGLAND, ASSIGNOR TO GENERAL ELECTRIC COMPANY, A CORPORATION OF NEW YORK

AUTOMATIC CONTROL EQUIPMENT

Application filed September 17, 1929. Serial No. 393,297.

My invention relates to automatic control equipments and particularly to automatic control equipments for mercury arc rectifiers and its object is to provide an improved arrangement of apparatus for automatically starting an arc in a mercury arc rectifier and then placing the rectifier in service whereby the rectifier equipment is shut down and locked out if the arc is not established within a predetermined time interval.

My invention will be better understood from the following description when taken in connection with the accompanying drawings and its scope will be pointed out in the appended claims.

Figure 1:
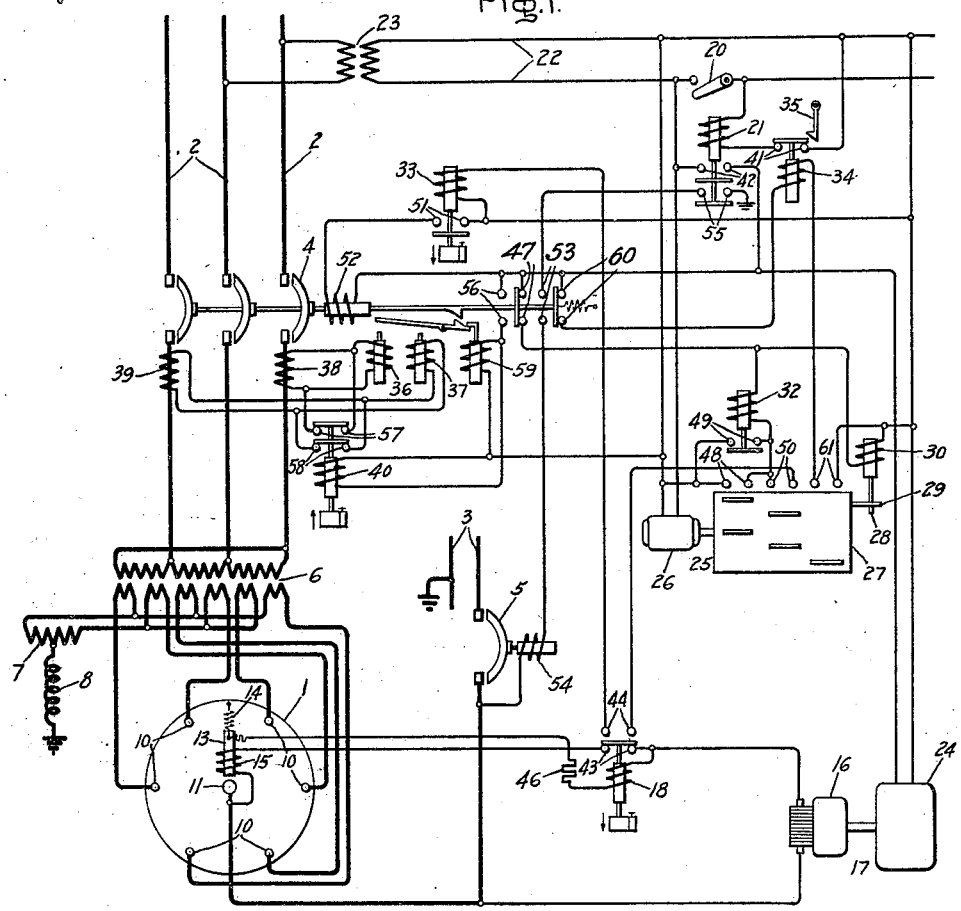
Figure 2:
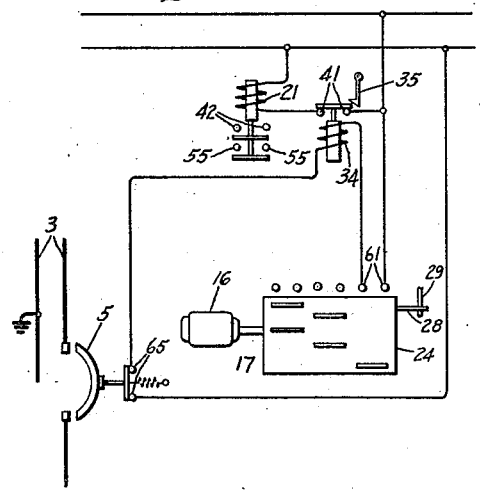

In the accompanying drawings, Fig. 1 diagrammatically shows an automatic control equipment for a mercury arc rectifier which embodies my invention and Fig. 2 diagrammatically shows a modification of a portion of the embodiment shown in Fig. 1.

Referring to the arrangement shown in Fig. 1, 1 represents a mercury arc rectifier which is arranged to be interconnected between an alternating current supply circuit 2 and a direct current load circuit 3 by means of suitable switches 4 and 5 respectively. In order to obtain the desired direct current voltage from the rectifier 1, a power transformer 6 is connected between the rectifier 1 and the alternating current supply circuit 2. The secondary windings of the power transformer 6 are connected in star and the neutrals thereof are connected through an interphase transformer 7 and a smoothing reactor 8 to the negative side of the direct current circuit 3 which, in the particular embodiment shown in the drawings, is the ground.

The rectifier 1 comprises a plurality of anodes 10 which are connected to the secondary terminals of the power transformer 6 and a cathode 11 which is connected to the positive side of the direct circuit 3 by the switch 5.

Due to the characteristics of the mercury arc current flows from any anode 10 to the cathode 11 when the voltage of the anode is higher than that of the cathode but the current never flows in the reverse direction except under abnormal conditions. Since each anode is connected to one end of a separate secondary winding of the power transformer 6 the other end of which is connected to the negative or grounded side of the load circuit by means of the interphase transformer 7 and reactor 8, each anode during a portion of each cycle of the alternating current has a potential higher than any one of the other anodes and during that period allows a current to flow to the cathode across the mercury arc after it has once been started.

As the mercury arc is not self-starting, some form of arc establishing means, examples of which are well known in the art, has to be provided. In the present embodiment of my invention I have shown the rectifier as being provided with an auxiliary or arc striking anode 13 for establishing the arc. This anode 13 is normally held out of engagement with the mercury by means of a spring 14 and is arranged to be moved into engagement with the mercury by means of a solenoid 15 which when energized places the spring 14 under tension. When the anode 13 engages the mercury a circuit from a suitable source of current, shown in the drawings as the generator 16 of a motor generator set 17, is completed through a control relay 18 which, when energized, effects the de-energization of the solenoid 15 so that the spring 14 draws the starting anode 13 out of the mercury and thereby establishes an exciting arc in the rectifier. After the exciting arc has been established the switches 4 and 5 are successively closed so that current flows from the anodes 10 to the cathode 11 of the rectifier and in this manner energy is transferred from the alternating current supply circuit 2 to the direct current load circuit 3.

In accordance with my invention, I provide an improved arrangement of apparatus for controlling the automatic starting of the rectifier 1 whereby if the arc establishing means fails to establish an arc within a predetermined time or for any reason the automatic starting operation is not completed within a predetermined time the equipment is shut down and locked out.

In accordance with the embodiment of my invention shown in the drawings, the normal starting and stopping of the rectifier is effected by the closing and opening of a hand switch 20 in the circuit of a master control device 21. Any other suitable control means, examples of which are well known in the art, may be employed instead of or in addition to the manually controlled switch 20 to control the energization of the master relay 21 to effect the starting and stopping of the rectifier 1.

As shown in the drawings, the closing of the control switch 20 completes the circuit of the master control relay 21 across a suitable control circuit 22 which is connected to the secondary winding of a control transformer 23 the primary of which is connected across the supply circuit 2. The energization of the master control relay 21 initiates the starting of the motor 24 of the motor generator set 17 so that the operation of the arc establishing means is initiated. The energization of the master relay 21 also initiates simultaneously with the initiation of the arc establishing means but independently of whether or not the arc establishing means establishes an arc, the operation of a timing device 25 which controls the closing of the switch 4 and the locking out of the equipment. As shown in the drawings, the timing device 25 comprises a motor driven timer 27 the motor 26 of which is permanently connected across the control circuit 22. The motor 26 is normally prevented from rotating the timer 27 by a stop 28 which engages a projection 29 on the timer 27. The stop 28, however, is arranged to be moved out of engagement with the projection 29 by means of a release magnet 30 the circuit of which is arranged to be completed by the master relay 21 when this relay is energized and the switch 4 is open. During each revolution of the timer 27 it effects, in case an exciting arc has been established, a predetermined number of closures of the switch 4 with predetermined time intervals between successive reclosures by successively effecting the energization of the control relays 32 and 33, which in turn control the current of the closing coil 52 of the switch 4. The closing of the switch 4 effects the completion of an energizing current for the closing coil 54 and closes the switch 5.

In case the arc establishing means fails to establish an arc or some other abnormal condition occurs so that the switch 4 is not closed within a predetermined time after the operation of the master relay 21 is effected the timer 27 is arranged to effect the operation of a lockout relay 34. The lockout relay 34 when energized opens the energizing circuit of the master relay 21 which when deenergized effects the shutting down of the automatic control equipment. The lockout relay is arranged in any suitable manner, examples of which are well known in the art, so that it prevents the energizing circuit of the master relay 21 from being subsequently completed by the control switch 20 until after the lockout relay has been reset manually. As shown in the drawings, the lockout relay 34 is of the type which is held in its energized position by a manually releasable latch 35.

In order to protect the rectifier against overloads and arc backs, the switch 4 is provided with the overload trip coils 36 and 37 which are respectively energized by means of the current transformer 38 and 39 so that they are energized in response to the currents flowing in two of the phases of the supply circuit 2. Since the inrush or transient current of the power transformer 6 at the instant the switch 4 is closed may, under normal conditions be several times normal current and may last for several cycles it is necessary to prevent the trip coils 36 and 37 from effecting the opening of the switch 4 until after this transient has disappeared. In the particular arrangement shown in the drawings this result is obtained by providing a time relay 40 which normally short-circuits the windings of the overload trip coils 36 and 37 and which is arranged to be energized in response to the closing of the switch 4 to remove the short-circuit from around the trip coils 36 and 37 and thereby render the trip coils operative to effect the opening of the switch 4 after it has remained closed for a predetermined length of time.

The operation of the arrangement shown in Fig. 1 is as follows: When it is desired to place the rectifier in operation the control switch 20 is closed so that the coil of the master relay 21 and the contacts 41 of the lockout relay 34 in series therewith are connected across the control circuit 22. The master relay 21 by closing its contacts 42 connects the motor 24 of the motor generator set 17 across the supply circuit 22 so that the starting of the motor generator set 17 is effected. As soon as the voltage of the generator 16 of the motor generator set builds up to a predetermined value, the solenoid 15 of the arc establishing means is energized sufficiently to move the striking anode 13 into engagement with the mercury of the rectifier. The energizing circuit of the solenoid 15 includes the contacts 43 of the control relay 18. As soon as the striking anode 13 engages the mercury current flows through the coil of the control relay 18 which is connected in series with the striking anode 13 and the cathode 11 across the terminals of the generator 16. The current through the relay 18 causes this relay to open its contacts 43 and close its contacts 44. The opening of the contacts 43 which are in the circuit of the solenoid 15 effects the deenergization of the solenoid 15 so that the spring 14 moves the starting anode 13 out of engagement with the mercury and thereby establishes an arc in the rectifier. Since the arc resistance is very low, sufficient current flows through the arc between the starting anode 13 and the mercury to maintain the control relay 18 in its energized position. In order to limit the current through the relay 18 to a predetermined value it may be desirable, in some cases, to connect a suitable resistor 46 in series with the coil of the relay 18.

The closing of the contacts 42 of the master relay 21 also completes, independently of whether or not the starting arc is established in the rectifier, an energizing circuit for the release magnet 30 of the timing device 25. This circuit, which is connected across the control circuit 22, also includes the auxiliary contacts 47 on the switch 4 so that the release magnet 30 is not energized when the timer 27 is in its normal position and the switch 4 is closed. The energization of the release magnet 30 draws the stop 28 out of engagement with the projection 29 so that the constantly energized motor 26 can drive the timer 27.

Within a short time after the release magnet 30 is energized, during which time the starting arc is established under normal conditions, the timer 27 closes its contacts 48 and completes across the control circuit 22 an energizing circuit for the control relay 32. This energizing circuit also includes the contacts 42 of the master relay 21 and the auxiliary contacts 47 of the switch 4. The control relay 32 by closing its contacts 49 completes a locking circuit for itself which is independent of the contacts 48 of the timer 27. Subsequently, the timer 27 opens its contacts 48 and closes its contacts 50 and thereby completes across the control circuit 22, an energizing circuit for the control relay 33 provided an arc has been established in the rectifier 1 so that the relay 18 is energized. The energizing circuit of the control relay 33 is from one side of the control circuit 22 through the coil of the relay 33, contacts 44 of the control relay 18, contacts 50 of the timer 27, contacts 49 of the control relay 32 to the other side of the control circuit 22. The control relay 33 by closing its contacts 51 connects the closing coil 52 of the switch 4 across the control circuit 22. The energization of the closing coil 52 effects the closing of the switch 4 so that the rectifier 1 is connected to the supply circuit 2.

When the switch 4 closes, its auxiliary contacts 53 complete an energizing circuit for the closing coil 54 of the switch 5, across the direct current terminals of the rectifier, so that the switch 5 is closed to connect the rectifier to the direct current load circuit 3 if the direct current voltage of the rectifier is above a predetermined value. The circuit of the closing coil 54 also includes the contacts 55 of the master relay 21.

When the switch 4 closes, its auxiliary contacts 56 complete, across the control circuit 22, an energizing circuit for the control relay 40 which removes the short-circuits from around the trip coils 36 and 37 by opening its contacts 57 and 58; and an energizing circuit for the under-voltage trip coil 59 for the switch 4.

If the switch 4 remains closed, the timer 27 is returned to its normal position by the motor 26 in which position it is stopped by the stop 28 engaging the projection 29, since the circuit of the release magnet 30 is open at the auxiliary contacts 47 of the closed switch 4.

If at any time the switch 4 is opened for any reason while the master relay 21 is energized, the closing of the auxiliary contacts 47 of the switch 4 effects the energization of the release magnet 30 so that the timer 27 is operated by the motor 6 to effect the reclosing of the switch 4 in the manner above described. If the switch 4 does not remain closed after the first reclosure thereof the timer 27 is arranged to effect a plurality of reclosures before the timer reaches its lockout position which is reached just prior to its normal position during each revolution of the timer. As shown in the drawings the timer 27 is arranged to effect two closures of the switch 4 during each revolution of the timer.

If the switch 4 is open so that its auxiliary contacts 60 are closed when the timer reaches its lockout position in which position the timer contacts 61 are closed a circuit which also includes the contacts 42 of the master relay 21 is completed, across the control circuit 22, for the lockout relay 34. The lockout relay 34 by opening its contacts 41 in the energizing circuit of the master relay 21 effects the deenergization of the master relay and locks out the equipment against a restart by rendering the master relay unresponsive to the operator of the control switch 20 until the latch 35 of the lockout relay has been released manually.

Since the timing device 25 is started independently of whether or not the arc establishing means establishes an arc in the rectifier, it will be observed that this timing device effects the locking out of the equipment in case an arc is not established within a predetermined time after the master relay 21 is energized as well as when some other abnormal condition prevents the automatic switching equipment from effecting the closing of the switch 4 within a predetermined time after the master relay 21 is energized.

Under normal operating conditions, the rectifier 1 is shut down by the opening of the control switch 20 which deenergizes the master relay 21. The master relay 21, by opening its contacts 42 and 55, effects the deenergization of the low voltage trip coil 59 of the switch 4 and the closing coil 54 of the switch 5 so that the rectifier is disconnected from the supply circuit 2 and the load circuit 3. The stopping of the motor generator 17 is effected by the opening of the contacts 42 of master relay 21 which are also in the energizing circuit of the motor 24.

In the modification shown in Fig. 2, the circuit of the lockout relay 34 includes the auxiliary contacts 65 on the switch 5 instead of the auxiliary contacts 60 on the switch 4. With this change in the connections of the lockout relay 34, it is necessary for the automatic switching equipment to complete the closing of the switch 5 as well as the closing of the switch 4 within a predetermined time after the master relay 21 is energized in order to prevent the locking out of the control equipment.

While I have, in accordance with the patent statutes, shown and described my invention as applied to a particular system and as embodying various devices diagramatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an electric circuit, a mercury arc rectifier, arc establishing means for said rectifier, a switch for connecting said rectifier to said circuit, a timing device, a control device for initiating the operation of said arc establishing means and said timing device, means for effecting the operation of said control device, means controlled by said timing device and said arc establishing means for effecting the closing of said switch if there is an arc in said rectifier at the expiration of a predetermined time interval after the operation of said control device is effected, and means controlled by said timing device for rendering said control device unresponsive to the operation of the means for effecting the operation thereof if said arc establishing means fails to establish an arc within a predetermined time after the operation of said control device is effected.

2. In combination, an electric circuit, a mercury arc rectifier, arc establishing means for said rectifier, a switch for connecting said rectifier to said circuit, a motor operated timer, a control device for initiating the operation of said arc establishing means and the operation of said timer independently of the operation of said arc establishing means, means controlled by said timer and said arc establishing means for closing said switch, and means controlled by said timer for rendering said control device inoperative to effect the operation of said arc establishing means if said arc establishing means fails to establish an arc within a predetermined time interval.

3. In combination, an electric circuit, a mercury arc rectifier, arc establishing means for said rectifier, a switch for connecting said rectifier to said circuit, a motor operated timer, means for starting said timer into operation and simultaneously initiating the operation of said arc establishing means, means controlled by said timer and arc establishing means for effecting the closing of said switch if it is open and an arc exists in said rectifier after a predetermined time interval has elapsed after the operations of said arc establishing means and timer have been initiated, and means controlled by said timer for rendering said starting means inoperative to initiate the operation of said arc establishing means if an arc is not established in said rectifier within a predetermined time after the operation of said arc establishing means is started.

4. In combination, an electric circuit, a mercury arc rectifier, arc establishing means for said rectifier, a switch for connecting said rectifier to said circuit, means including a motor operated timer for closing said switch a plurality of times with predetermined time intervals between successive reclosures of said switch and for preventing the subsequent closing of said switch if it is not closed within a predetermined time, and means for initiating the operation of said arc establishing means and the operation of said timer, the operation of said timer being effected independently of the operation of said arc establishing means.

5. In combination, an electric circuit, a mercury arc rectifier, arc establishing means for said rectifier, a switch for connecting said rectifier to said circuit, a motor operated timer, means for initiating the operation of said arc establishing means and the operation of said timer independently of the operation of said arc establishing means, means controlled by said timer and arc establishing means for closing said switch a predetermined number of times within a predetermined time interval, and means controlled by said timer and switch for rendering said initiating means inoperative to effect the operation of said arc establishing means if said switch is open when said timer is in a predetermined position.

6. In combination, an electric circuit, a mercury arc rectifier, arc establishing means for said rectifier, a switch for connecting said rectifier to said circuit, a motor operated timer, means for initiating the operation of said arc establishing means and the operation of said timer independently of the operation of said arc establishing means, and means controlled by said timer for closing said switch a plurality of times with predetermined time intervals between successive reclosures if the arc is established in said rectifier within a predetermined time interval and for rendering said initiating means inoperative to effect the operation of said arc establishing means if an arc is not established in said rectifier within a predetermined time after the operation of said initiating means.

7. In combination, an electric circuit, a mercury arc rectifier, arc establishing means for said rectifier, a switch for connecting said rectifier to said circuit, a motor operated timer, means for initiating the operation of said arc establishing means and the operation of said timer independently of the operation of said arc establishing means, means controlled by said timer and arc establishing means for closing said switch a predetermined number of times within a predetermined time interval, if an arc is established in said rectifier during said time interval, and means controlled by said timer and switch for rendering said arc establishing means inoperative if said switch is open after said timer has been in operation for a predetermined time.

8. In combination, two electric circuits, a mercury arc rectifier, arc establishing means for said rectifier, switching means for connecting said rectifier to said circuits, a timing device, means for initiating the operation of said arc establishing means and the operation of said timing device independently of the operation of said arc establishing means, means controlled by said timing device and arc establishing means for effecting the operation of said switching means to connect said rectifier to said circuits after an arc has been established in said rectifier, and means controlled by said timing device and switching means for rendering said arc establishing means inoperative if a predetermined operation of said switching means has not been effected within a predetermined time after the initiation of the operation of said timing device.

In witness whereof, I have hereunto set my hand this 6th day of September, 1929.

PAUL MATHEWS, Jr.